United States Patent
Gero

(10) Patent No.: US 12,199,551 B2
(45) Date of Patent: Jan. 14, 2025

(54) SOLAR PANEL TURRET APPARATUS

(71) Applicant: Sunnoo Inc., Las Cruces, NM (US)

(72) Inventor: Martin Anthony Gero, Las Cruces, NM (US)

(73) Assignee: Sunnoo Inc., Las Cruces, NM (US)

( * ) Notice: Subject to any disclaimer, the term of this patent is extended or adjusted under 35 U.S.C. 154(b) by 86 days.

(21) Appl. No.: 18/302,616

(22) Filed: Apr. 18, 2023

(65) Prior Publication Data

US 2023/0336111 A1     Oct. 19, 2023

Related U.S. Application Data

(60) Provisional application No. 63/332,104, filed on Apr. 18, 2022.

(51) Int. Cl.
    *H02S 20/30*     (2014.01)

(52) U.S. Cl.
    CPC .................................. *H02S 20/30* (2014.12)

(58) Field of Classification Search
    CPC ....... H01L 31/00–078; Y02E 10/50–60; H02S 20/00–32
    USPC .................................................. 136/243–265
    See application file for complete search history.

(56) References Cited

U.S. PATENT DOCUMENTS

| | | |
|---|---|---|
| 6,443,145 B1 | 9/2002 | Buron et al. |
| 7,705,277 B2 | 4/2010 | Noble et al. |
| 8,642,936 B2 | 2/2014 | Pan |
| 9,471,050 B2 | 10/2016 | Tilley et al. |

FOREIGN PATENT DOCUMENTS

EP      2363662 A3      6/2012

*Primary Examiner* — Bach T Dinh

(57) ABSTRACT

The solar panel turret apparatus is a device that features lesser moving parts compared to other conventional systems. More specifically, the device utilizes a singular motor driven system, that enables a solar panel to rotate 360 degrees horizontally. The single motor and single rotational movement allow the turret device to adjust to a wide range of angles. Further, the device is a solely software driven apparatus, wherein the software is configured to manipulate the turret device to achieve optimal solar capture. In other words, a precision stepper motor controlled by the software, enables the device to locate the sun anywhere in the sky with the press of a button. The device further eliminates the need for sensors, thereby reducing costs while increasing reliability of the device. Furthermore, when used in tandem, each solar panel can position independently, or a group can position in a way beneficial to the entire array.

20 Claims, 5 Drawing Sheets

SOLAR PANEL TURRET APPARATUS

FIELD OF THE INVENTION

The present invention relates to solar panel technologies. More specifically, the present invention relates to automated solar panel turret fixtures.

BACKGROUND OF THE INVENTION

Solar panel fixtures are often employed in photovoltaic farms, or solar panel systems attached onto buildings and structures. These fixtures range from roof fixtures, turrets, or wall brackets. Automated solar panel fixtures may also be employed, such that these automated solar panel fixtures position the solar panel to an optimal position for solar capture. These conventional systems often employ gearbox transmissions, servos, and other robotic parts to tilt or rotate the solar panels to the optimal position. These conventional systems, however, are complicated and expensive to produce, leading to higher margins of defects, higher susceptibility of parts breakage, higher maintenance upkeep, and overall higher costs to construct and maintain. Therefore, it is an objective of the present invention to provide a mechanically efficient and cost effective automated solar panel turret fixture.

The present invention aims to solve these problems. The present invention features lesser moving parts comparted to any other conventional system. The present invention utilizes a singular motor driven system. The present invention is solely software driven, where the software is configured to manipulate the present invention to achieve optimal solar capture. This solely software driven controlling means eliminates the needs for sensors, therefore reducing costs while increasing reliability of the present invention.

SUMMARY OF THE INVENTION

The present invention is a solar panel turret apparatus that features lesser moving parts compared to other conventional systems. More specifically, the present invention utilizes a singular motor driven system, that enables a solar panel mounted on the turret device to rotate 360 degrees horizontally. The single motor and single rotational movement allow the turret to adjust to a wide range of angles. Further, the present invention is a solely software driven apparatus, where the software is configured to manipulate the present invention to achieve optimal solar capture. In other words, the precision stepper motor controlled by the software, enables the present invention to locate the sun anywhere in the sky with the press of a button. This solely software driven controlling means eliminates the needs for sensors, thereby reducing costs while increasing reliability of the present invention. Furthermore, when used in tandem, each solar panel can position independently, or a group can position in a way beneficial to the entire array.

DETAIL DESCRIPTIONS OF THE INVENTION

All illustrations of the drawings are for the purpose of describing selected versions of the present invention and are not intended to limit the scope of the present invention.

Figure 1:
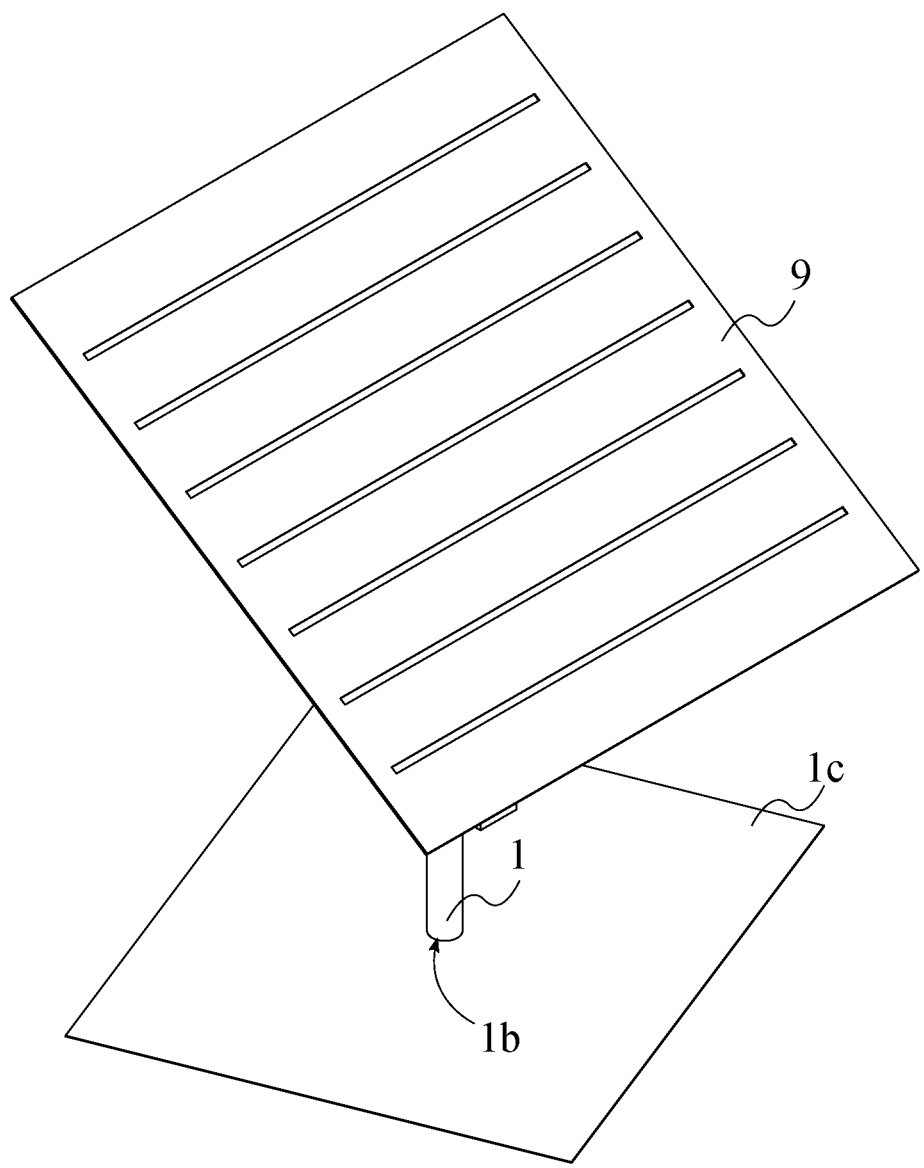
FIG. 1 is a top perspective view of the present invention.
Figure 2:
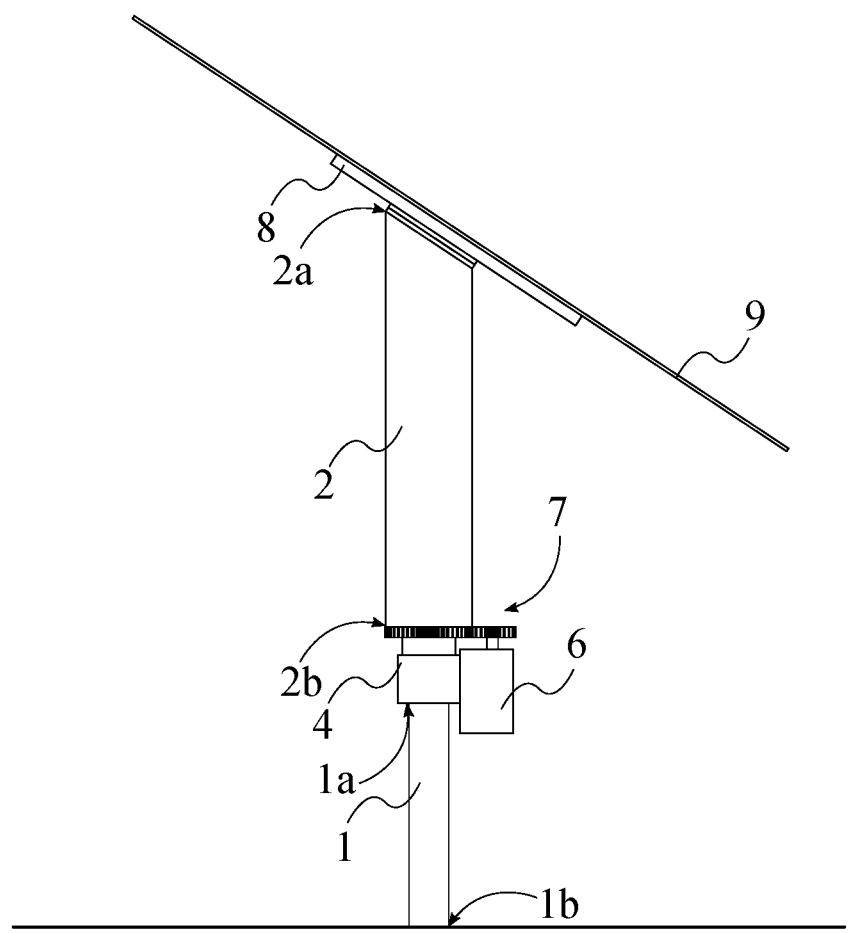
FIG. 2 is a side view of the present invention.
Figure 3:
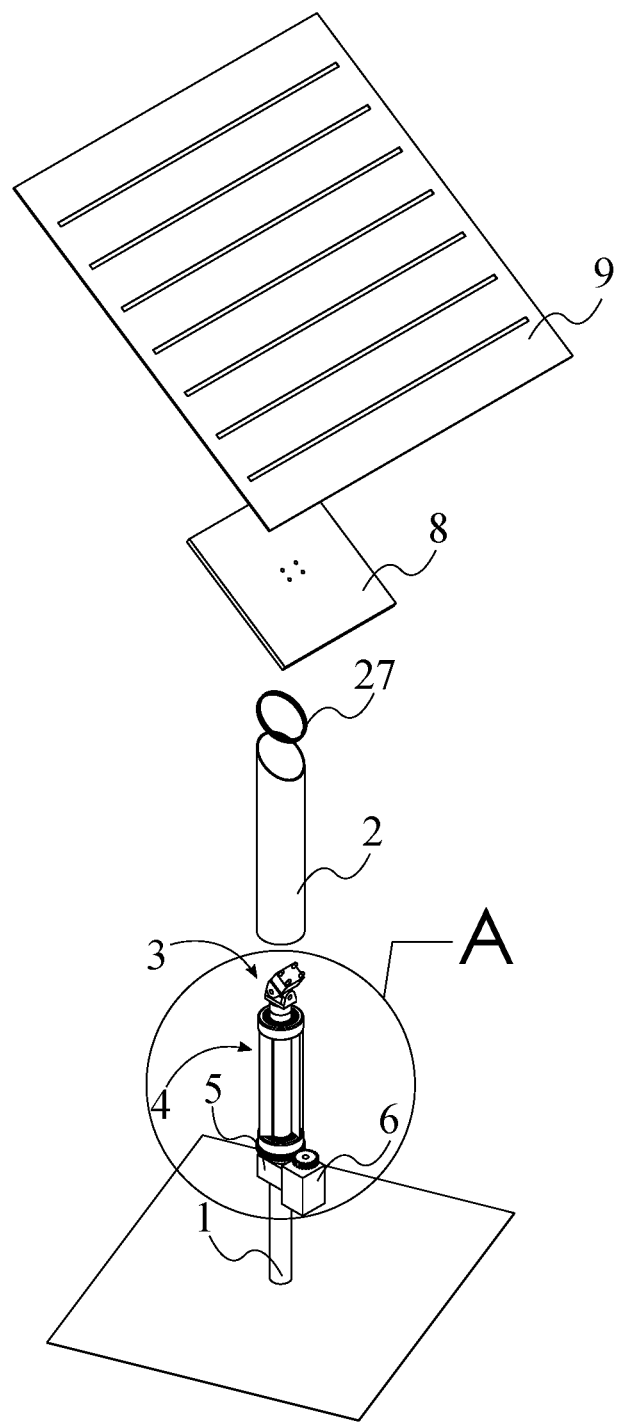
FIG. 3 is an exploded view of the present invention.
Figure 4:
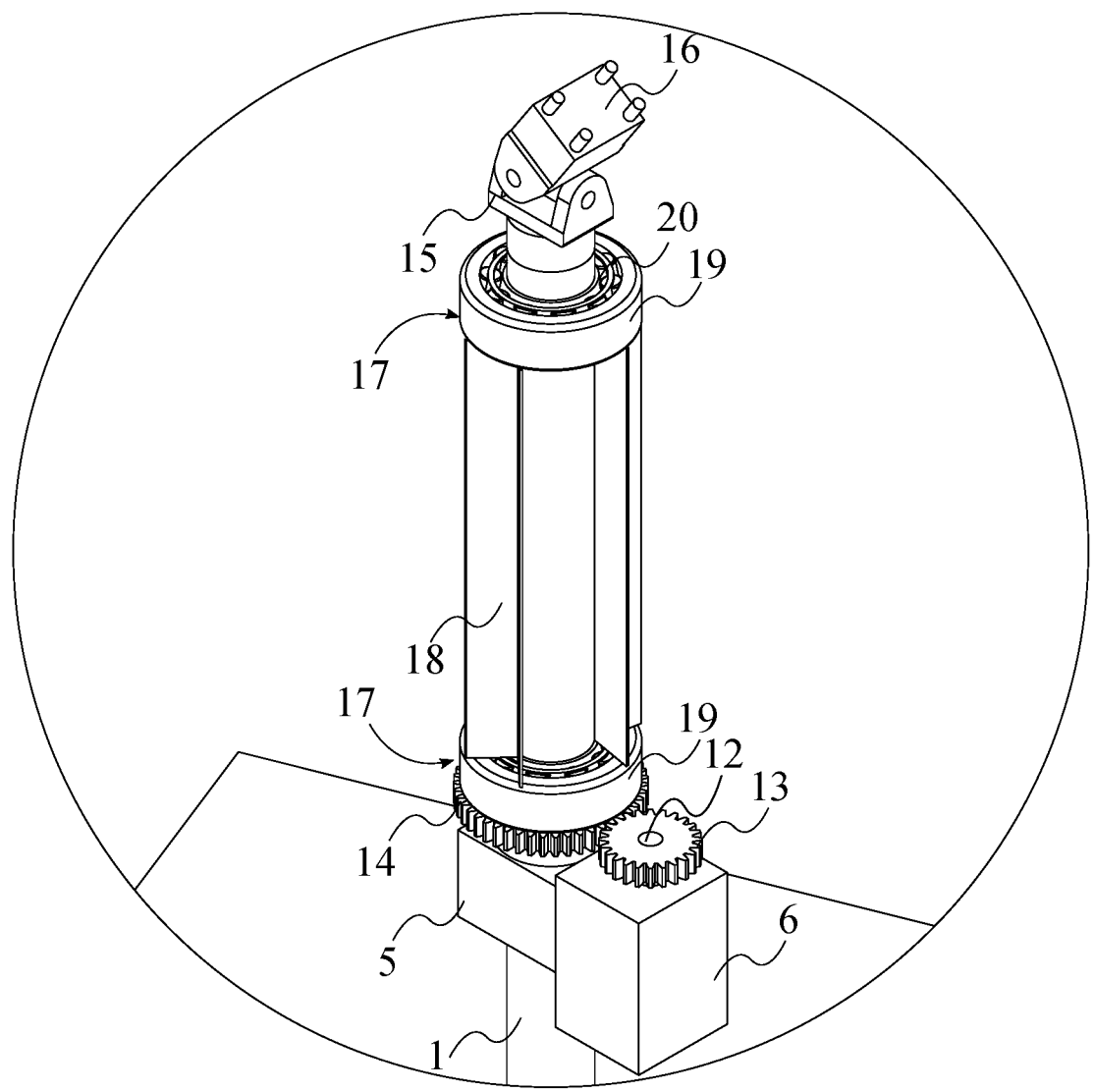
FIG. 4 is a detailed view of the present invention taken along circle A in FIG. 3

The following description is in reference to FIG. 1 through FIG. 5. According to a preferred embodiment, the present invention comprises a foundation post 1, a tilt housing 2, a swivel joint element 3, a rotary assembly 4, a mounting bracket 5, a motor 6, a driving element 7, a mounting plate 8, a solar panel 9. The foundation post 1 comprises a first end 1a and a second end 1b, wherein the first end 1a is positioned opposite to the second end 1b along the foundation post 1. In the preferred embodiment, the foundation post 1 takes the form of any suitable static vertical support implement that provides structural support to the components that constitutes the solar panel turret apparatus. More specifically, the foundation post 1 takes the form of a rigid pole, where the first end 1a serves as the upper end, while the second end 1b serves as the base end of the post fixed onto any flat surface (1c), platform, or any other suitable surface. The tilt housing 2 comprises a tilt end 2a and a base end 2b, wherein the tilt end 2a and the base end 2b are positioned terminally opposite to each other along the tilt housing 2. In the preferred embodiment, the tilt housing 2 serves as the main tilting member of the present invention, where the tilt housing 2 is configured to tilt and swivel the mounting plate 8 along the tilt end 2a when the tilt housing 2 is rotating along the rotary assembly 4. In other words, the rotary assembly 4 is rotatably connected within the tilt housing 2. To that end, the motor 6 is connected adjacent to the mounting bracket 5, and the motor 6 is operatively engaged to the base end 2b through the driving element 7. In the preferred embodiment, the driving element 7 takes the form of any suitable driving element that mechanically bridges the operative connection of the motor 6 and the tilt base end 2b. In the preferred embodiment, the mounting bracket 5 takes the form of any suitable mounting bracket 5 that mounts the motor 6 to the foundation post 1. Additionally, the mounting bracket 5 is configured to mount the rotary assembly 4 along the mounting post, where the mounting bracket 5 is fixed along the foundation post 1, and wherein the rotary assembly 4 is connected onto the mounting bracket 5. Further, the mounting bracket 5 is connected between the rotary assembly 4 and the first end 1a. As seen in FIG. 2, the rotary assembly 4 is mounted along the foundation post 1 through the mounting bracket 5, wherein the rotary assembly 4 extends away from the first end 1a opposite to the second end 1b. Further, the rotary assembly 4 is connected onto the mounting bracket 5.

In the preferred embodiment, the swivel join element 3 is connected adjacent to the first end 1a. Working in conjunction with the swivel joint element 3 and the tilt end 2a, the mounting plate 8 cams along the tilt end 2a profile such that the mounting plate 8 tilts to a specified angle range. In the preferred embodiment, the tilt end 2a of the tilt housing 2 takes the form of an angled cut, such that the mounting plate 8 cams and swivels along the tilt housing 2 when the tilt housing 2 is rotating along the rotary assembly 4. This tilting articulation allows the present invention to adjust to a specified angle, allowing the mounting plate 8 to orient at an optimal position suitable for solar capture. In the preferred embodiment, the mounting plate 8 facilitates the connection of the solar panel 9. To accomplish this, the mounting plate 8 is connected adjacent to the swivel joint element 3 opposite to the first end 1a, and the solar panel 9 is mounted onto the mounting plate 8. The solar panel 9 may comprise any size, material, components, arrangement of components, etc. that are known to one of ordinary skill in the art, as long as the intents of the present invention are not altered.

As seen in FIG. 2, the present invention comprises a rotary element 10, wherein the rotary element 10 is rotatably connected between the tilt end 2a and the mounting plate 8. In other words, the rotary element 10 acts as a sandwiching member between the mounting plate 8 and the tilt end 2a of the tilt housing 2. This is so that, the motor 6 actuates the tilt housing 2, and that the tilt housing 2 rotates along the rotary element 10, relative to the foundation post 1.

Figure 5:
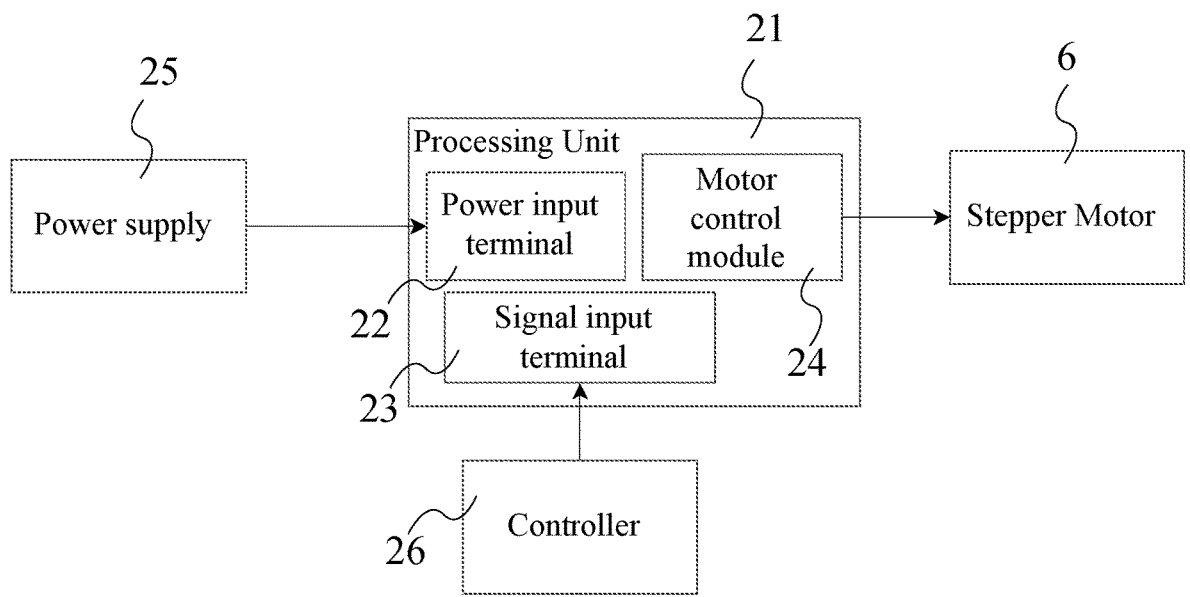
FIG. 5 is a circuit diagram used in the present invention.

Continuing with the preferred embodiment, the motor 6 comprises a stator body 11 and a rotary shaft 12. As seen in FIG. 5, the stator body 11 is connected adjacent to the mounting bracket 5 and the rotary shaft 12 is rotatably engaged to the stator body 11. In the preferred embodiment, the motor 6 takes the form of a stepper motor. It should be noted that the motor may comprise any size, brand, technology, etc. that is known to one of ordinary skill in the art, as long as the intents of the present invention are not altered.

According to the preferred embodiment, the driving element 7 comprises a drive gear 13 and a turret gear 14. Preferably, the drive gear 13 is torsionally connected to the rotary shaft 12, and the turret gear 14 is torsionally connected to the base end 2b. Furthermore, the drive gear 13 and the turret gear 14 are rotatably engaged to each other.

In the preferred embodiment, the swivel joint element 3 takes the form of any suitable articulated joint element 3 that facilitates a free range of motion while maintaining a secure connection along the first end 1a and the mounting plate 8. To accomplish this, the swivel joint element 3 comprises a first joint connector 15 and a second joint connector 16. Preferably, the first joint connector 15 and the second joint connector 16 are hingedly connected to each other. Further, the first joint connector 15 is connected adjacent to the first end 1a, and the second joint connector 16 is connected adjacent to the mounting plate 8.

In the preferred embodiment, the rotary assembly 4 comprises a plurality of roller elements 17 and a plurality of vertical supports 18. Preferably, the plurality of roller elements 17 is distributed along the foundation post 1, and the plurality of vertical supports 18 is distributed about the plurality of roller elements 17. Further, the plurality of vertical supports 18 traverses along the plurality of roller elements 17. Additionally, each of the plurality of roller elements 17 comprises a mounting ring 19 and a rotary ring 20. Preferably, the rotary ring 20 is rotatably connected to the mounting ring 19, and the mounting ring 19 is torsionally connected to the tilt housing 2. In the preferred embodiment, the plurality of roller elements 17 takes the form of roller bearings that installs between the foundation post 1 and the tilt housing 2, wherein the rotary ring 20 is situated along the foundation post 1 and the mounting ring 19 is situated along the interior of the tilt housing 2. In the preferred embodiment, the plurality of vertical supports 18 takes the form of any suitable vertical supporting implement, such as, but not limited to L-beam extrusions or any other suitable vertical supporting implement. Thus, the plurality of vertical supports 18 bridges the plurality of roller elements 17 together to form the rotary assembly 4. Additionally, the plurality of vertical supports 18 serves as additional structural integrity along the tilt housing 2.

Continuing with the preferred embodiment, and in reference to FIG. 6, the present invention comprises a processing unit 21, wherein the processing unit 21 is electronically connected to the motor 6. In the preferred embodiment, the processing unit 6 serves as the on-board PCB that handles all electronic and electrical functions associated with the solar panel turret apparatus. Preferably, the processing unit 21 comprises a power input terminal 22, a signal input terminal 23, and a motor control module 24. As seen in FIG. 6, the present invention further comprises a power supply 25 and a controller 26. In the preferred embodiment, the power supply 25 is electrically connected to the power input terminal 22. Preferably, the power supply 25 takes the form of any suitable power supply, such as, but not limited to direct feed solar panel feed power bank, external power source, or any other suitable power supply. In the preferred embodiment, the controller 26 takes the form of any suitable interface module that transmits software driven motor commands to the processing unit 21, such that the processing unit 21 interacts with the motor control module 24, where the motor control module 24 manipulates the motor 6, and where the motor 6 is configured to rotate the tilt housing 2 which in turn will tilt the mounting plate 8 to any position along the tilt housing 2. To accomplish this, the power supply 25 is electrically connected to the power input terminal 22, the controller 26 is electronically connected to the signal input terminal 23, and the motor control module 24 is electronically connected to the motor 6. It should be noted that any other mechanical (for example thrust bearing 27), electrical and electronic components that are known to one of ordinary skill in the art may be utilized by the present invention, as long as the intents of the present invention are not altered. More specifically, the present invention may be linked to tracking systems that utilizes a specific circuit board and firmware/software to track target (sun), by reading valve via power collection sensor. Solar panel array power collection value is interpreted by the firmware and in return will control the single motor to find highest power collection value and follow the source. East and west (horizontal control) has a 360-degree range. North and south (vertical) control has a range between 15-45 degrees. Systems can be linked together to control multiple tracking units or independently. Controlling data/parameters and recorded data can be accessed via circuit board mounted screen and or Bluetooth, Wi-Fi connection. Thus, when used in tandem, each solar panel can position independently, or a group can position in a way beneficial to the entire array.

Although the invention has been explained in relation to its preferred embodiment, it is to be understood that many other possible modifications and variations can be made without departing from the spirit and scope of the invention as hereinafter claimed.

What is claimed is:

1. A solar panel turret device comprising:
   a foundation post;
   a tilt housing;
   a swivel joint element;
   a rotary assembly;
   a mounting bracket;
   a motor;
   a driving element;
   a mounting plate;
   a solar panel;
   the foundation post comprising a first end and a second end;
   the tilt housing comprising a tilt end and a base end;
   the first end being positioned opposite to the second end along the foundation post;
   the tilt end and the base end being positioned terminally opposite to each other along the tilt housing;
   the rotary assembly being mounted along the foundation post through the mounting bracket;

the rotary assembly extending away from the first end opposite to the second end;
the mounting bracket being connected between the rotary assembly and the first end;
the rotary assembly being rotatably connected within the tilt housing;
the swivel join element being connected adjacent to the first end;
the motor being connected adjacent to the mounting bracket;
the motor being operatively engaged to the base end through the driving element;
the mounting plate being connected adjacent to the swivel joint element opposite to the first end; and
the solar panel being mounted onto the mounting plate.

2. The solar panel turret device of claim 1, comprising:
a rotary element; and
the rotary element being rotatably connected between the tilt end and the mounting plate.

3. The solar panel turret device of claim 1, comprising:
the motor comprising a stator body and a rotary shaft;
the stator body being connected adjacent to the mounting bracket; and
the rotary shaft being rotatably engaged to the stator body.

4. The solar panel turret device of claim 1, comprising:
the driving element comprising a drive gear and a turret gear;
the drive gear being torsionally connected to the rotary shaft;
the turret gear being torsionally connected to the base end; and
the drive gear and the turret gear being rotatably engaged to each other.

5. The solar panel turret device of claim 1, comprising:
the swivel joint element comprising a first joint connector and a second joint connector;
the first joint connector and the second joint connector being hingedly connected to each other;
the first joint connector being connected adjacent to the first end; and
the second joint connector being connected adjacent to the mounting plate.

6. The solar panel turret device of claim 1, wherein the rotary assembly being connected onto the mounting bracket.

7. The solar panel turret device of claim 1, comprising:
the rotary assembly comprising a plurality of roller elements and a plurality of vertical supports;
the plurality of roller elements being distributed along the foundation post;
the plurality of vertical supports being distributed about the plurality of roller elements; and
the plurality of vertical supports traversing along the plurality of roller elements.

8. The solar panel turret device of claim 7, comprising:
each of the plurality of roller elements comprising a mounting ring and a rotary ring;
the rotary ring being rotatably connected to the mounting ring; and
the mounting ring being torsionally connected to the tilt housing.

9. The solar panel turret device of claim 7, wherein the plurality of vertical supports bridges the plurality of roller elements together to form the rotary assembly.

10. The solar panel turret device of claim 1, comprising:
a processing unit; and
the processing unit being electronically connected to the motor.

11. The solar panel turret device of claim 10, comprising:
the processing unit comprising a power input terminal, a signal input terminal, and a motor control module;
a power supply and a controller;
the power supply being electrically connected to the power input terminal;
the controller being electronically connected to the signal input terminal; and
the motor control module being electronically connected to the motor.

12. A solar panel turret device comprising:
a foundation post;
a tilt housing;
a swivel joint element;
a rotary assembly;
a mounting bracket;
a motor;
a driving element;
a mounting plate;
a rotary element;
a solar panel;
the foundation post comprising a first end and a second end;
the tilt housing comprising a tilt end and a base end;
the first end being positioned opposite to the second end along the foundation post;
the tilt end and the base end being positioned terminally opposite to each other along the tilt housing;
the rotary assembly being mounted along the foundation post through the mounting bracket;
the rotary assembly extending away from the first end opposite to the second end;
the mounting bracket being connected between the rotary assembly and the first end;
the rotary assembly being rotatably connected within the tilt housing;
the swivel join element being connected adjacent to the first end;
the motor being connected adjacent to the mounting bracket;
the motor being operatively engaged to the base end through the driving element;
the mounting plate being connected adjacent to the swivel joint element opposite to the first end;
the rotary element being rotatably connected between the tilt end and the mounting plate; and
the solar panel being mounted onto the mounting plate.

13. The solar panel turret device of claim 12, comprising:
the motor comprising a stator body and a rotary shaft;
the stator body being connected adjacent to the mounting bracket; and
the rotary shaft being rotatably engaged to the stator body.

14. The solar panel turret device of claim 12, comprising:
the driving element comprising a drive gear and a turret gear;
the drive gear being torsionally connected to the rotary shaft;
the turret gear being torsionally connected to the base end; and
the drive gear and the turret gear being rotatably engaged to each other.

15. The solar panel turret device of claim 12, comprising:
the swivel joint element comprising a first joint connector and a second joint connector;
the first joint connector and the second joint connector being hingedly connected to each other;

the first joint connector being connected adjacent to the first end; and the second joint connector being connected adjacent to the mounting plate.

16. The solar panel turret device of claim 12, wherein the rotary assembly being connected onto the mounting bracket.

17. The solar panel turret device of claim 12, comprising:

the rotary assembly comprising a plurality of roller elements and a plurality of vertical supports;

the plurality of roller elements being distributed along the foundation post;

the plurality of vertical supports being distributed about the plurality of roller elements; and the plurality of vertical supports traversing along the plurality of roller elements.

18. The solar panel turret device of claim 17, comprising:

each of the plurality of roller elements comprising a mounting ring and a rotary ring;

the rotary ring being rotatably connected to the mounting ring; and the mounting ring being torsionally connected to the tilt housing.

19. The solar panel turret device of claim 12, comprising:

a processing unit; and the processing unit being electronically connected to the motor.

20. The solar panel turret device of claim 19, comprising:

the processing unit comprising a power input terminal, a signal input terminal, and a motor control module;

a power supply and a controller;

the power supply being electrically connected to the power input terminal;

the controller being electronically connected to the signal input terminal; and the motor control module being electronically connected to the motor.

* * * * *